Aug. 4, 1936.  L. A. SCHUPBACH  2,050,130
JACK
Filed Nov. 27, 1935
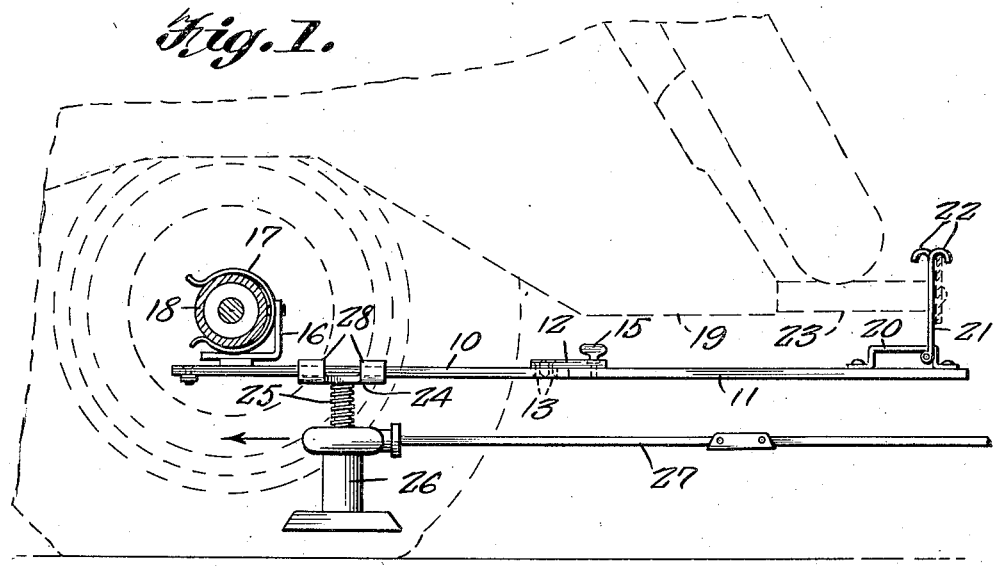
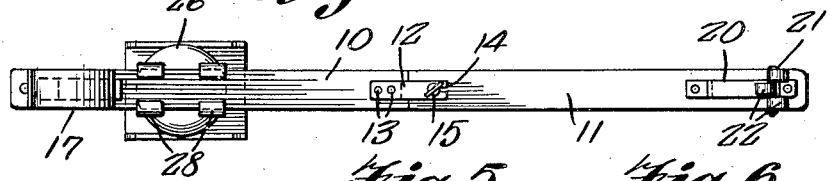
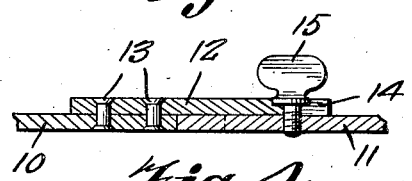
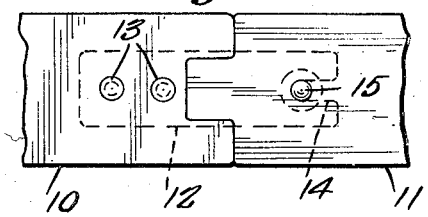
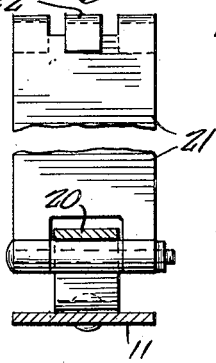
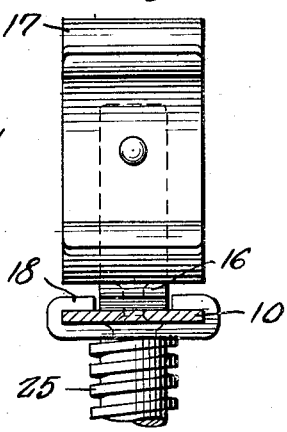
Louis A. Schupbach,
INVENTOR
BY Victor J. Evans & Co.
ATTORNEY Patented Aug. 4, 1936

2,050,130

UNITED STATES PATENT OFFICE 2,050,130

JACK

Louis A. Schupbach, Waterbury, Conn.

Application November 27, 1935, Serial No. 51,918

1 Claim. (Cl. 254—133)

The invention relates to a jack and more especially to a foldable track for lifting jacks for use with motor vehicles.

The primary object of the invention is the provision of a foldable track of this character, wherein the same can be readily placed in position so as to permit convenient guiding of a lifting jaw beneath the rear housing of a motor vehicle and thereby relieving the operative of the jack from climbing beneath the vehicle for this purpose.

Another object of the invention is the provision of a track of this character, wherein the construction thereof is novel in form so that it can be readily foldable and conveniently carried within the vehicle without occupying excessive space and is handy for service in the placing of the lifting jack beneath the vehicle.

A further object of the invention is the provision of a track of this character, which is simple in construction, thoroughly reliable and efficient in its purpose, readily and easily handled, capable of quick attachment and detachment to and from the vehicle, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention pointed out in the claims hereunto appended.

In the accompanying drawing:

Figure 1 is a side elevation of the track in position for the guiding of the lifting jack beneath a motor vehicle, the track being constructed in accordance with the invention.

Figure 2 is a top plan view.

Figure 3 is a fragmentary vertical sectional view through the track.

Figure 4 is a fragmentary bottom plan view.

Figure 5 is a vertical sectional view at the hanger end of the track.

Figure 6 is a further vertical transverse sectional view showing the manner of slidably fitting the lifting jack with the track.

Similar reference characters indicate corresponding parts throughout the several views in the drawing.

Referring to the drawing in detail, the track comprises a pair of relatively narrow flat strip-like sections 10 and 11, respectively, each made from metal and separably latched with each other through the medium of a stationary hasp 12 riveted at 13 to one of the sections and this hasp is adapted to overlap the other section and in its free end is provided a notch 14 for accommodating a set screw 15 which is in threaded engagement with the section 11, the hasp being permanent on the section 10.

The section 10 close to the inner end thereof carries an L-shaped bracket 16 supporting a spring clip 17 which is engageable with the rear axle housing 18 of a motor vehicle, a portion thereof being indicated at 19, while the section 11 carries a bail 20 for the loose connection of a hanger 21 having the reversely set hooks 22, these being adapted for engagement with a rear bumper 23 as carried by the vehicle 19. In this manner the track is separably attached to the vehicle.

Slidably engageable with the track, that is the sections 10 and 11 thereof, is the swiveled bearing head 24 of the lifting screw 25 of a lifting jack 26, the latter being of conventional type and is operated from a handle or actuating rod 27 of the foldable type.

The head 24 carries at opposite sides thereof jaws 28 slidably fitting the sections 10 and 11 of the track so that such lifting jack 26 can be manually shifted or slid upon the track to bring the jack into position beneath the vehicle, particularly the housing 18 for the lifting of such vehicle as will be clearly apparent in Figure 1 of the drawing.

The track when not in use is readily foldable on separation of the sections 10 and 11 from each other so that it can be carried within the vehicle and stored in the least possible space. The use of the track eliminates the necessity of an operative of the automobile from climbing beneath the automobile for the placing of the jack 26 in position for the lifting of such vehicle.

What is claimed is:

A device of the character described comprising a two-part bar constituting a guide track, means for separably connecting the two parts of said bar together, a loop at one end of the bar, a spring clip fixed to the other end of the bar for quick detachment engagement upon the rear axle housing of a motor vehicle, a double hook loosely engaged with said loop for suspended engagement with a rear bumper of a motor vehicle for disposing in conjunction with the clip the said bar in a horizontal position, a slide removably engageable with the bar and having trackage thereon to a point beneath the rear axle housing, and a lifting jack having a screw head swiveled to said slide.

LOUIS A. SCHUPBACH.